April 9, 1963 M. A. HASS ETAL 3,084,435
DENTAL BALANCING METHOD AND APPARATUS
Filed Feb. 15, 1960 2 Sheets-Sheet 1
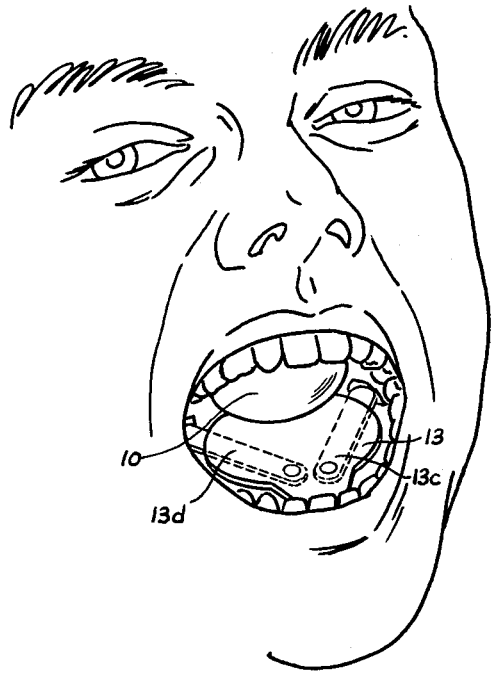
Fig. 1
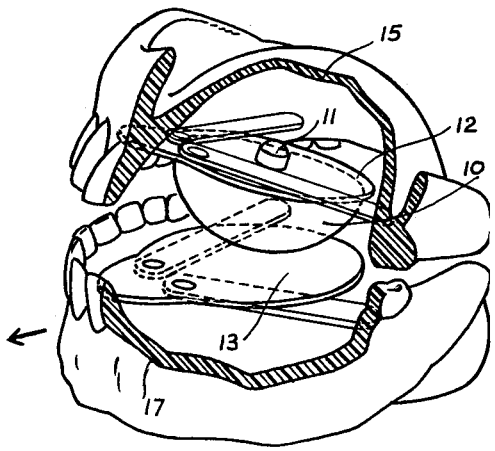
Fig. 2
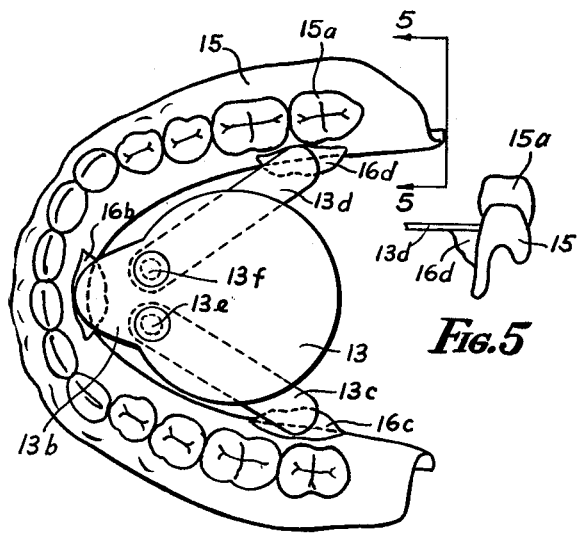
Fig. 3
Fig. 5
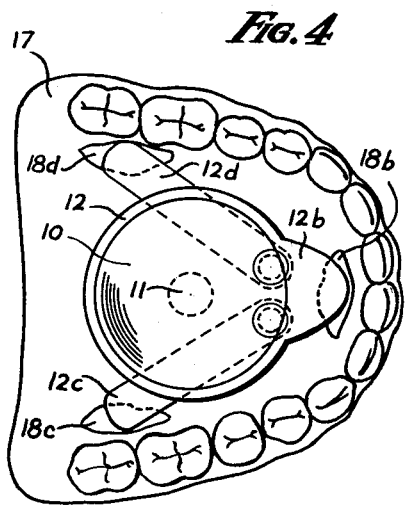
Fig. 4
INVENTORS
MARTIN A. HASS
DALE L. HILL
By Fulwider Mattingly Huntley
ATTORNEYS

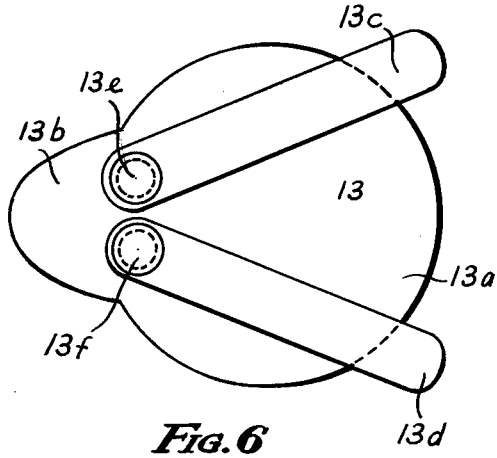
Fig. 6
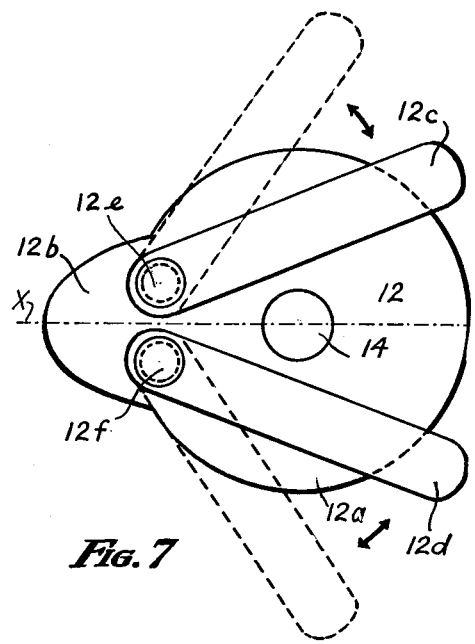
Fig. 7
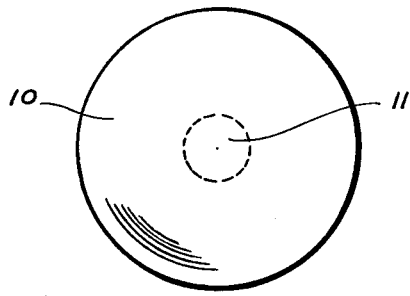
Fig. 8
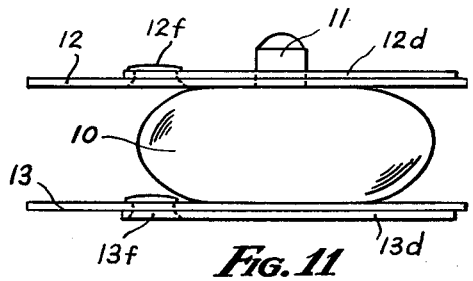
Fig. 10
Fig. 11
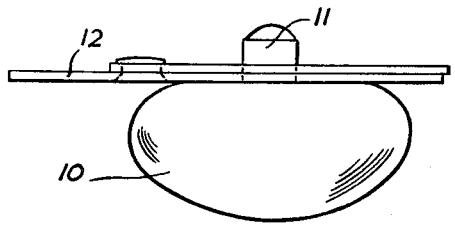
Fig. 9
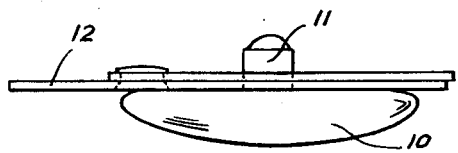
INVENTORS
MARTIN A. HASS
DALE L. HILL
BY Fulwider Mattingly & Huntley
ATTORNEYS United States Patent Office 3,084,435
Patented Apr. 9, 1963

3,084,435
DENTAL BALANCING METHOD AND
APPARATUS
Martin A. Hass, Beverly Hills, and Dale L. Hill, Encino,
Calif.; said Hill assignor to Bruce M. Hass
Filed Feb. 15, 1960, Ser. No. 8,702
8 Claims. (Cl. 32—1)

This invention relates to a method and apparatus for balancing the structure of the human mouth. The method and apparatus is applicable to balancing mouth structure including artificial dentures which have been previously manufactured, to balancing the biting surface of natural human teeth in the jaws, or to balancing an artificial denture during the course of its custom design and manufacture.

It will be recalled that the lower jaw bone is hinged to the skull by a pair of condyles, one at each end of the jaw bone, which hingedly seat in sockets shaped and positioned to receive them. The lower teeth in turn are rigidly supported on the hinged lower jaw bone. The upper teeth are, of course, rigidly positioned in the bone structure of the upper jaw which is fixed with respect to both the hard palate and the rest of the skull.

The surfaces of the upper and lower teeth which come in contact when the mouth is closed to biting or masticating position are commonly referred to as the occlusal surfaces. If the teeth in one's mouth are not of the correct relative height, that is, if the teeth are too high on one side, then when the occlusal surfaces of the hard teeth come together, there will be a tendency to torque, tilt or lift up on one side of the lower jaw bone or of the lower denture. It is extremely important to get the correct bite or interengagement of the upper and lower teeth and jaws. During a protrusive bite in which the anterior teeth are touching (as is the case in biting off a piece of lettuce), the condyles are not seated in the condyler sockets. It is only when biting occurs back on the molars, during chewing and grinding, that the condyles are seated.

It has been found necessary to good health to insure that the condyles are seated equally, whether the teeth be natural or artificial. If the condyles are seated unequally, the person tends to become nervous and there will be a crushing of the membranes in the condyle. A pathological condition of the condyle can thus result from unequalized biting pressure. Earache and hearing difficulties may also be produced.

In general, the device and method of our invention involve the provision and use of a pressure equalizing member. With the device in place in the patient's mouth, the patient, in effect, closes down on the equalizing member to create an occlusal pressure of the molars which will be greater than the diastolic blood pressure of the individual patient; the hard palate thus becoming the reference surface of the system.

The occlusal pressure of the molars is equally distributed by the equalizing member and the associated elements, and the lower jaw is thus balanced, as are the condyles within their sockets.

With this ideal condition prevailing, a "reading" is taken of the vertical spacing between opposed teeth or between surfaces from which teeth are to project. If the vertical spacing is improper, adjustments are made to correct or equalize said spacing. In treating natural teeth, this is done by selectively grinding the occlusal surfaces. In connection with dentures, it is accomplished by such grinding or by selectively shimming the dentures.

Thus, the critical measurements having to do with the nature of the bite, are taken while the jaw positions simulate those of molar biting and chewing.

The steps of "reading" and adjustment are repeated until a condition of even spacing prevails. Accordingly, when the patient later performs molar chewing, the occlusal pressure at the condyles will be balanced, thus evenly seating the condyles within their sockets, and the occlusal faces of the teeth will be balanced with these conditions prevailing, dentures will not "wobble"; and, whether the teeth be natural or artificial, said pathological condition of the condyles will be avoided.

One very important advantage is secured from a balancing procedure, such as just described, and this relates to the seating of the dentures on the gum ridges. In the making of dentures, an impression of the gum ridges and surrounding areas is taken, and the dentures are made to conform to and fit these ridges and areas. Once the initial post-extraction shrinkage of the gum ridges has occurred, the ridges retain their shape for an extended period of time, unless they are subjected to excessive pressures. By the balancing process of this invention, the dentures are firmly seated on the gum ridges and the pressure developed by chewing will be balanced and evenly distributed so that no excessive local pressures are developed. Consequently, the gum ridge tissue will not be damaged, nor will the ridge shrink to cause early misfitting of the denture.

The balanced seating of the dentures is secured by the use of the equalizing means which automatically causes the firm and even positioning of the dentures against their corresponding gum ridges. Additionally, the equalizing means makes use of the laws of fluid pressure to insure that equal pressure is exerted on both sides of the jaws. While the dentures are in this properly seated and pressure balanced condition, the occlusal surfaces are then matched so that total even contact of the teeth is secured. When this balancing and matching has been completed, removal of the equalizing means will leave the teeth and mouth structure in balance, with chewing pressures properly distributed over the whole gum ridge area.

It is, therefore, an object of this invention to provide a method and apparatus for shaping the occlusal surfaces of teeth to provide a biting action in which the condyles are properly seated and balanced in their sockets.

It is a further object of this invention to provide a method and apparatus by means of which previously completed artificial dentures may be adjusted and balanced for the particular mouth in which they are worn.

It is a further object of this invention to provide a method and apparatus for balancing the occlusal surfaces of the natural tooth structure in the mouth.

It is yet another object of this invention to provide a method and apparatus for designing artificial dentures to insure that they will be properly balanced in the mouth.

It is a further object of this invention to provide a flexible bubble which may be inflated to masticating pressure and positioned in the mouth to function as a true center bearing pivot in order to balance the tooth structure.

It is yet another object of this invention to provide a method and apparatus using an inflated flexible bubble which is, in effect, seated in the mouth and bearing against the center of the hard palate to balance the condyles in their sockets so that the occlusal surfaces may be shaped to seat snugly and exactly one each other, when the jaw is thus properly balanced.

Other objects, features, and advantages of the present invention will be more fully apparent to those skilled in the art from the following detailed description taken in connection with the accompanying drawings in which like reference characters refer to like parts throughout and wherein:

FIGURE 1 is a front perspective view showing a patient having a set of dentures in his mouth and having the bubble balancer of the invention inserted in his opened mouth for balancing the dentures.

FIGURE 2 is a fragmentary perspective view, partially in section, showing the relationship between the dentures in the patient's mouth and the bubble balancing apparatus of this invention.

FIGURE 3 is a plan view of the lower denture with the bottom bearing plate thereon.

FIGURE 4 is a plan view of the upper denture with the upper bearing plate thereon.

FIGURE 5 is a detailed view showing the manner in which one arm of the bottom bearing plate is attached to the lower denture.

FIGURE 6 is a diagrammatic plan view of the lower bearing plate.

FIGURE 7 is a diagrammatic plan view of the upper bearing plate.

FIGURE 8 is a plan view of the inflated balancing bubble.

FIGURE 9 is a side elevational view showing the bubble of FIGURE 8 inserted in the top bearing plate of FIGURE 7.

FIGURE 10 is a view similar to FIGURE 9 showing the balancing bubble inflated to a lesser pressure.

FIGURE 11 is a side elevational view showing the balancing bubble compressed between the upper and the lower bearing plates.

Turning now to the drawings, it will be seen that we provide upper and lower bearing plates, preferably in the form of tripod supports 12 and 13, between which is inserted a resilient spacer member, such as the inflatable balancing bubble 10.

The inflatable balancing bubble 10 may be formed of flexible latex rubber or any similar suitable material and has a central solid rubber plug 11 protruding from the top thereof. The balancing bubble 10 is inflated by inserting a hypodermic or other similar needle through the plug 11 to admit pressurized air or other suitable fluid to the interior of the bubble. The plug 11 is sufficiently resilient to be self-sealing, when the hypodermic needle is withdrawn. The important significance of this type of inflation means will be pointed out later.

As shown in FIGURES 1 and 2, the inflated balancing bubble 10 in use is seated between the upper tripod plate 12 and the lower tripod plate 13. As may be most clearly seen in FIGURE 7, the upper tripod plate 12 is provided with an aperture 14 which is dimensioned to snugly receive the protruding plug 11 of the inflatable bubble 10 to thereby securely position the bubble 10 with respect to the upper tripod plate 12.

Each of the tripod plates comprises a substantially circular main body section, such as the sections 12a and 13a. At one edge of each of these main circular sections are substantially semi-circular protrusions 12b and 13b, respectively, which are adapted to be seated in the forward portion of the mouth. The aperture 14 is located at the center of main body section 12a. The projected long axis X of protuberance 12b extends through the center of aperture 14. Each of the tripod plates is further provided with a pair of pivotally mounted arms, such as the arms 12c and 12d on the plate 12 and arms 13c and 13d on the plate 13. These arms may be mounted for pivotal movement in a plane parallel to the plane of the plate by any conventional means, such as the rivets 12e and 12f in the plate 12 and the rivets 13e and 13f in the plate 13, respectively. Preferably, rivets 12e and 12f are spaced equally from axis X, and are equally radially spaced from the centers of the respective main body sections 12a and 13a.

It will be noted that each of the pivotally mounted arms is of a dimension and position such that the arm extends beyond the edge of the plate. In the illustrative embodiment shown in the drawings, it is found convenient to pivot the arms adjacent to each other near the base of the protrusions at the forward portions of the disks or plates. The arms then extend in a generally rearward direction and may be swung outwardly toward the side of the disk or plate sufficiently far to seat at the edges of the patient's mouth. Of course, the pivotal arrangement permits adjustment of the device to mouths of varying configurations or sizes.

The manner in which the inflated balancing bubble and the tripod plates are inserted in the mouth for use is best seen in FIGURES 1, 2, 3, 4, and 5. It will be noted from FIGURE 3 in particular, that the lower tripod plate 13 is positioned with its adjustable arms on its underside adjacent to the bottom of the patient's mouth. The edge of the arm 13c and 13d is temporarily secured to the lower denture 15 by sealing, sticky, or adhesive wax 16d which secures the end of arm 13d to the denture 15. Similarly, the piece of wax 16c is used to secure arm 13c to denture 15 and the piece of wax 16d is used to secure the protrusion 13b to the forward central portion of the denture 15. It is thus seen that the plate 13 is secured and supported at three points to the denture 15, thus affording a tripod mount for the plate. These three points, as may be seen in FIGURE 3, are the ends of the two arms 13c and 13d which are supported on opposite sides at the rear of the mouth near the molars and the front protrusion 13b which is supported at the central forward portion of the mouth in back of the teeth. Preferably, point 13b is at the center of the mouth, whereas points 13c and 13d are on opposite sides of and equally spaced from point 13b.

As may be seen in FIGURE 4, a similar mounting arrangement is used to secure the upper tripod plate 12 to the upper denture plate 17. The forward protrusion 12b of the plate is secured by a piece of adhesive or sticky wax 18b and the ends of arms 12c and 12d are respectively secured adjacent the rear molars by pieces of wax 18c and 18d.

The detailed view of FIGURE 5 shows the manner in which the arm 13d of plate 13, for example, is positioned adjacent a rear molar 15a on the upper denture 15 and is secured to the upper denture by the adhesive wax 16d.

It will, of course, be apparent that the dentures 15 and 17, although shown as conventionally completed dentures, could also be the wax forms used in preliminary fittings in the design and manufacture of the denture. Furthermore, the method and apparatus of this invention are also applicable to the adjustment and balancing of natural teeth. In any of these applications or modes of operation, the tripod plates and balancing bubble are used in substantially the same manner shown in the drawing. Where the natural teeth are involved, the tripod plates may be attached directly to the teeth rather than to a denture plate.

When a denture is being manufactured, the upper and lower wax forms or models approximately fit the patient's mouth and the tripod plates are anchored to these wax pieces, with the soft latex rubber bubble inflated with air and positioned between the plates. It is known as a general law of physics that a confined gas under pressure will exert equal pressure in all directions. When the patient bites down on the inflated air bubble, it will drive the lower denture model solidly against the lower gum and it will drive the upper denture solidly against the upper gum. This tends to balance both the upper and lower base plates of the denture and to balance the condyles in their sockets.

In the past, when the hard surfaces of teeth came together, if the teeth were too high on one side, the lower denture would lift up or torque, tilt or shift. With the bubble balancer used as shown herein, this cannot happen. Since the lower plate is held solidly in position by the bubble balancer, the dentist can observe exactly how the teeth come together. The dentist can thus see whether they hit on one side while they are, for example, $1/16''$ low on the other side. This, of course, is the case where the bubble balancer is used with completed dentures or with natural teeth.

Where the apparatus is used in designing a new denture, it is first used before the teeth are inserted in the upper and lower wax denture models. In this case, the upper wax rim is relatively hard wax and the lower wax rim of the denture is relatively soft wax. As the patient presses down on the bubble, the hard wax will press into the soft wax when the patient bites against the pressure of the inflated bubble. This is true, because the bubble is out of the way of the gums of the mouth. The impressions made in these wax forms are then used to determine the position the occlusal surfaces will occupy when the final denture is made. Suitable measurements for determining how far the patient should bite down to obtain the right action are, of course, made. This preliminary determination of the occlusal surfaces and the measurements necessary for designing the dentures is made precise and accurate by the provision of the three point supported plate which, in turn, holds the inflated bubble entirely within the mouth away from the gum surfaces and which ultimately acts against the rigidly positioned hard palate. The three point support has been found to be substantially superior to two point support methods.

In carrying out the usual steps of manufacturing a denture, it will be recalled that first an impression is made of the patient's mouth and the upper wax base plate is pressed hard against the stone model from this impression so that it fits almost as well as the finished denture would fit. However, it is made in wax and is soft so that it can bend. One advantage of the present balancing technique is to reduce the bending or warping forces on such a model.

The wax model is normally brought down to the lip line to occupy the position the front teeth would normally occupy. In making the necessary measurements, a reference line is established between the alae of the nose and the tragus of the ear. The plane of occlusion can be determined with reference to the lip line determination of the length of the teeth and by parallelism to the line between the pupils of the eyes.

Thus, in using the apparatus of this invention in the initial design of dentures, the usual measurements to determine the occlusal plane can be made while using conventional wax models in conjunction with the bubble balancer shown in the drawing. The inflated bubble will securely and solidly seat the wax denture models to assure precision and accuracy of the design measurements. By use of the inflated bubble supported between the two plates, the entire mouth system or structure is balanced. The bridges or gums, the occlusal surfaces, and the condyles necessarily assume a predetermined desired balanced relationship with respect to the hard palate and the skull.

In practice, most patients will place their tongue beneath the lower rear portion of the lower metal tripod plate so that the tongue does not at all interfere with the balancing operation.

The inflated bubble balancer shown herein achieves a center balancing pivoting action without the necessity of making a specific mechanical determination of the exact center of the upper part of the mouth, as would be the case if a single solid metal pin were to be used as the pivot. In order to use such a pin, it is necessary to place it at the exact center of the mouth. The extended surface of the bubble balancer bearing against the tripod support, however, achieves a center balancing action without the necessity of an exact physical determination of the center point by virtue of the fact that the compressed or confined gas will exert equal forces in all directions. The bubble shown is inflated to a predetermined desired pressure and in addition to its flexibility also has a certain amount of elasticity.

In the past, it has been taught that pressures used in balancing devices of any sort should be equal to the diastolic blood pressure, since this is the pressure with which the gums resist any force acting on them. This diastolic pressure is normally 1½ lbs. per square inch. It has been found, however, that when patients chew food, they bite with a pressure of 5 to 30 lbs. per square inch.

The present invention takes into account the fact that the only time when one is concerned with the location of his dentures is when he is biting food and exerting this 5 to 30 lbs. masticating pressure. It is under these pressures that the dentures must be correctly and solidly fitted over the gum ridges.

The masticating pressure, of course, varies from one patient to another. A frail person may bite with 5 lbs. pressure, whereas a large rugged person may bite with as much as 30 lbs. pressure. In no instance, however, is the present method or apparatus concerned with the typical 1½ lbs. diastolic pressure.

The balancing bubble shown in the drawings herein is thus preferably inflated to the masticating pressure which is normal for the individual for whom the tests are being made. As noted above, this pressure will in general vary between 5 and 30 lbs. Although it is preferred to inflate the bubble to the normal masticating pressure of the given individual, it should be pointed out that the critical point actually is only that the bubble must be inflated to a pressure greater than the diastolic blood pressure. Thus, if the bubble is adjusted to 5 lbs. pressure and the patient bites down with 30 lbs. pressure, the denture will still be solidly seated. On the other hand, if the adjustment is made to the diastolic blood pressure only, which does not cause any compression of the tissue at all, then the minute one goes beyond the diastolic blood pressure, there will be compression of the gums. When this happens, the dentures are shifted out of the desired position. That is to say, dentures which have been designed to the standard of the diastolic blood pressure, when subjected to the larger masticating pressure which compresses the gum tissues, are not properly balanced.

If it is desired to standardize on a single pressure for all individuals, it is preferred to select this pressure at approximately 3 to 5 lbs. since virtually any individual can bite down with at least that much pressure and since it is substantially greater than the diastolic blood pressure. In any event, however, it is in practice desirable to be able to deflate the bubble in order that it may be placed in an autoclave or other sterilizing apparatus. This deflation of the bubble may be accomplished in much the same way, as its inflation, by inserting a hypodermic needle through the plug or stem 11 and letting the air escape through the needle.

In the use of the apparatus of this invention, there are no tubes or other members protruding from the mouth. It is not necessary in this method, to use the tube of a sphygmomanometer. The freedom from such apparatus is one significant advantage of the method of the present invention. If a rubber tubing, pencil, or the like is placed in the mouth for the patient to bite on, the patient instictively bites with the anterior teeth. When something touches the lips, one instinctively bites with the anterior teeth. For this reason, it is difficult to get the correct bite because people tend to bite on the front teeth rather than on the rear teeth. It is, therefore, desirable not to have anything projecting between the lips. Hence, the bubble balancer is inflated and sealed, rather than maintained under pressure through a tubing which projects between the lips. With the apparatus shown, placed in the center of the mouth, people instinctively chew down on the posterior teeth and automatically get the correct bite, because the condyles are seated in their pivotal position which will give the greatest purchase.

With either natural teeth, dentures, or dentures to be designed, it is important to get the correct bite, because if the bite is protrusive, that is, with the anterior teeth touching, the condlyes are not seated in their sockets.

Only when one bites back on the molars and starts to chew and grind, do the condyles fully seat. The object of the present method is to get the condyles seated fully and equally. As noted above, it has been found that if the condyles are not equally seated or balanced, the person becomes nervous and tends to create a crushing of the membranes in the condyles. Such a condition can also lead to earache and impairment of hearing.

This condition can also arise where the natural teeth are out of balance. For example, if a young person has molars extracted and the remaining teeth slip out of position, then even if he thereafter is chewing on the surfaces of the teeth, the condyles may well not be in a balanced position in the sockets. Such a condition can be corrected with the method and apparatus herein described simply by attaching the air bubble balancer 10 to the upper plate 12 to work against the plate 13 which is attached to the lower jaw. In order to attach the plates, an impression is taken of the natural upper and lower teeth and the plates are then fitted to these models by adjustment of their pivoted arms. The adhesive wax may then be used to properly seat the upper and lower tripod plates in the mouth. If desired, this wax may make a connection to the low spots or surfaces in the teeth commonly referred to as the interproximal spaces. Such a mounting technique, of course, would not interfere with the biting action of the teeth. Once the plates are adjusted, they are simply transferred from the model into the mouth to occupy the same position.

Thereafter, when the bubble balancer is placed in the mouth with its plug seated in the central hole in the upper plate, it will automatically balance the condyles and permit the dentist to see how the patient's teeth are coming together. If the teeth are coming together so that one side hits first, the dentist can easily mark that with a piece of carbon paper and spot it with a little diamond burr, and grind it until the teeth come together absolutely evenly. This will relieve the patient of condylar disturbances and possible consequent hearing troubles.

It will be noted that the present method and apparatus is particularly applicable to balancing natural teeth or finished dentures as well as to the original design of dentures. The present method relies upon the natural centering of the jaws without any restraints other than the pressure restraints of closing. No forward or backward or anterior-posterior restraint and no lateral restraint is placed on the jaws, so the jaws will automatically tend to center. The present method uses no tubes or other apparatus protruding from the front of the mouth, but relies upon the basic reflexes, such as swallowing, chewing, smiling, resting and speaking which when undisturbed, will naturally position the apparatus in the desired spot.

It will be noted, particularly from FIGURE 2, that the mechanical arrangement of the method and apparatus disclosed herein is such that the bubble balancer is generally in the center of the mouth cavity, that is, it is center bearing against the upper part of the hard palate surface, and that it delivers masticating pressure through the tripod supports or plates directly to the ridges and straight down to the center part of the lower plate. The arrangement is thus mechanically stable and will not lead to warping or wobbling.

It should further be pointed out that even where the bubble balancing technique is initially used in designing the denture plate, it may be necessary to rebalance the dentures after the mouth has gone through the normal initial shrinkage. Thus, the method in principle is equally applicable either to the initial design of the dentures, or to the correction and rebalancing of dentures manufactured some time ago, or to the balancing of the natural teeth. The fact that there is no apparatus protruding from the mouth facilitates this universal applicability. Where considerable shrinkage has occurred, of course, it may be desirable to reline the dentures rather than to grind high spots off the teeth. Whichever technique is used, the ultimate object is to achieve a balanced state in which the occlusal surfaces meet firmly throughout their length while biting against the bubble balancer which automatically assures that the condyles will be balanced in their sockets.

In practice, the balancing method disclosed herein finds its greatest application to the balancing of natural teeth or existing dentures. This results from the fact that, since the human organism is continually growing and changing, the shape of the gums similarly tends to change. With advancing age, the gums, particularly of a person wearing a denture, tend to shink. It is, therefore, desirable that periodically, as frequently as once a year, for example, the balance of the teeth should be tested and adjusted by rebalancing, if necessary. Of course, if the change is severe, as in the case of immediate dentures, where there is considerable change in the first few months, then the bubble balancer can be used during the course of relining the dentures by putting a soft impression material into the denture, putting it in the mouth, getting them closed on the bubble balancer, thereby exerting equal pressure, which then will take a perfectly balanced impression. This impression will be balanced to the occlusion of the teeth and will not be dependent upon the dentist holding them with his fingers.

In any mode of application of the balancing apparatus and method shown herein, it will be realized that the hard palate which forms the natural end point of resistance to chewing, is used as the end point of the forces exerted by the balancing apparatus. That is to say, the upper tripod plate is seated securely to transmit forces to the hard palate. The flexible, inflated bubble balancer is then securely fixed with respect to the upper plate and will transmit equal forces in all drections. The bubble balancer forms a center bearing working against the upper tripod plate and the hard palate in the mouth. The lower tripod plate which is held in a three point support by the jaw, then works against the inflated bubble balancer. Since the pressure of the bubble is greater than diastolic pressure, the forces exerted by the mouth tissue will be overcome and the hard palate and the jaw bone itself will ultimately take up the forces exerted by chewing. By virtue of the fact that the gas in the bubble transmits forces equally in all directions, the jaw will be balanced in its motion so that the condyles will automatically be seated in a balanced manner in their sockets. If now the occlusal surfaces of the teeth are adjusted to give closed firm biting in this position, such a balanced state will thereafter be assured.

While a particular exemplary preferred embodiment of the invention has been described in detail above, it will be understood that modifications and variations therein may be effected without departing from the true spirit and scope of the novel concepts of the present invention, as defined by the following claims.

We claim:

1. The method of balancing teeth in a human mouth comprising the steps of: placing a resilient member in the mouth in center bearing relationship to the hard palate, the occlusal surfaces of the teeth remaining uncovered; urging the upper and lower jaws together against the urging of said resilient member; and locating the occlusal surfaces of the upper and lower teeth to evenly space said surfaces, while exerting more than diastolic pressure on said member.

2. The method of balancing teeth in a human mouth comprising the steps of: placing an inflated flexible container in the central portion of the mouth, said container being located to exert a central pressure against the upper jaw and against the lower jaw, and to leave the occlusal surfaces of the teeth uncovered; moving the upper and lower jaws together against the urging of said flexible container; and positioning the occlusal surfaces of the upper and lower teeth to space said surfaces evenly as the jaws are moved together.

3. The method of balancing teeth in a human mouth comprising the steps of: restraining closing movement of the jaws by means of a resilient member centrally located between the jaws and acting to apply a central balanced restraining force against the upper jaw and the lower jaw, the occlusal surfaces of the teeth remaining uncovered; moving the jaws together agaist the restraint of said resilient member; and locating the occlusal surfaces of the upper and lower teeth to space said surfaces evenly as the jaws are moved together against the restraint of said resilient member.

4. The method of balancing teeth in a human mouth comprising the steps of: placing an inflated flexible container in the center portion of the mouth, said container being located to exert a pressure that restrains closure of the jaws while permitting free lateral and anterior-posterior movement of the jaws, the occlusal surfaces of the teeth remaining uncovered; closing the jaws against the restraint of said container; and positioning the occlusal surfaces of the upper and lower teeth relative to their respective jaws to space said surfaces evenly as the jaws are moved together against the urging of said flexible container.

5. The method of balancing teeth in a human mouth comprising the steps of: mounting an upper rigid member upon the upper jaw to transmit a force thereto, said member leaving uncovered the occlusal surfaces of the teeth of the upper jaw; mounting a lower rigid member upon the lower jaw to transmit a force thereto, said member leaving uncovered the occlusal surfaces of the teeth of the lower jaw, said upper and lower rigid members moving with their respective jaws and permitting complete freedom of movement of said jaws; interposing a resilient member between said upper and lower rigid members, said resilient member providing a balanced restraining force opposing the closing of the jaws while permitting unrestrained lateral and anterior-posterior movement of said jaws; closing the jaws and locating the occlusal surfaces of the upper and lower teeth with respect to their corresponding jaws to space said surfaces evenly as the jaws are moved together against the restraint of said resilient member.

6. The method of balancing teeth in a human mouth comprising the steps of: mounting an upper rigid member upon the upper jaw to transmit a force thereto, said member leaving uncovered the occlusal surfaces of the teeth of the upper jaw; mounting a lower rigid member upon the lower jaw to transmit a force thereto, said member leaving uncovered the occlusal surfaces of the teeth of the lower jaw, said upper and lower rigid members moving with their respective jaws and permitting complete freedom of movement of said jaws; mounting an inflated flexible resilient member upon one of said rigid members to bear against the other of said rigid members as the jaws are closed, said resilient member leaving uncovered the occlusal surfaces of the teeth, and resiliently opposing the closure of the jaws with a balanced force approximately equal to normal masticating pressure; moving the jaws toward closed position against the restraint of said resilient member; and positioning the occlusal surfaces of the upper and lower teeth to space said surfaces evenly as the jaws are moved together against the restraint of said resilient member.

7. Means for balancing teeth in a human mouth which includes: upper rigid means adapted to be mounted upon the upper jaw to transmit a force thereto, said means being shaped to leave uncovered the occlusal surfaces of the upper jaw; lower rigid means adapted to be mounted upon the lower jaw to transmit a force thereto, said means being shaped to leave uncovered the occlusal surfaces of the lower jaw, said upper and lower means having centrally located rigid faces opposing each other when mounted on their respective jaws; and inflatable resilient means mounted upon the central rigid face of one of said rigid means and positioned to bear against the central rigid face of the other of said rigid means as the jaws are closed.

8. Means for balancing teeth in a human mouth which includes: upper rigid means adapted to be mounted upon the upper jaw to transmit a force thereto, said means being of a size and shape to leave uncovered the occlusal surfaces of the upper jaw; lower rigid means adapted to be mounted upon the lower jaw to transmit a force thereto, said means being of a size and shape to leave uncovered the occlusal surfaces of the lower jaw, said upper and lower means having centrally located rigid faces opposing each other when mounted on their respective jaws; and a flexible resilient bubble-like member mounted upon the central rigid face of one of said rigid means and positioned to bear against the central rigid face of the other of said rigid means as the jaws are closed, said bubble-like member leaving the occlusal surfaces of the teeth uncovered, said bubble-like member opposing only the movement of said jaws, and providing an opposing force approximating that of natural mastication.

References Cited in the file of this patent

UNITED STATES PATENTS

| | | |
|---|---|---|
| 1,104,662 | Grier | July 21, 1914 |
| 1,235,169 | Tallon | July 31, 1917 |
| 1,713,755 | Gibson | May 21, 1929 |
| 1,734,398 | Phillips | Nov. 5, 1929 |
| 2,641,292 | Quillinan | June 9, 1953 |
| 2,841,872 | Glueck | July 8, 1958 |
| 2,937,443 | Skinner | May 24, 1960 |